United States Patent
Kumar et al.

(10) Patent No.: US 9,822,020 B2
(45) Date of Patent: Nov. 21, 2017

(54) NUTRIENT RECOVERY PROCESS

(71) Applicant: ANAERGIA INC., Burlington (CA)

(72) Inventors: Ashwani Kumar, Mississauga (CA); Juan Carlos Josse, Mission Viejo, CA (US); Michael David Theodoulou, Milton (CA); Sasha Michael Rollings-Scattergood, Fergus (CA)

(73) Assignee: Anaergia Inc., Burlington (CA)

( * ) Notice: Subject to any disclaimer, the term of this patent is extended or adjusted under 35 U.S.C. 154(b) by 176 days.

(21) Appl. No.: 14/652,615

(22) PCT Filed: Dec. 18, 2013

(86) PCT No.: PCT/CA2013/050985
§ 371 (c)(1),
(2) Date: Jun. 16, 2015

(87) PCT Pub. No.: WO2014/094162
PCT Pub. Date: Jun. 26, 2014

(65) Prior Publication Data
US 2015/0329399 A1    Nov. 19, 2015

Related U.S. Application Data

(63) Continuation-in-part of application No. 13/832,737, filed on Mar. 15, 2013, now Pat. No. 9,045,355.
(Continued)

(30) Foreign Application Priority Data

Dec. 18, 2012 (WO) ............... PCT/CA2012/050907

(51) Int. Cl.
*C02F 1/20* (2006.01)
*C02F 11/12* (2006.01)
(Continued)

(52) U.S. Cl.
CPC ............... *C02F 1/20* (2013.01); *C01C 1/10* (2013.01); *C01C 1/242* (2013.01); *C02F 11/04* (2013.01);
(Continued)

(58) Field of Classification Search
CPC .. C02F 1/20; C02F 11/12; C02F 11/04; C02F 11/121; C02F 2209/14
See application file for complete search history.

(56) References Cited

U.S. PATENT DOCUMENTS 5,030,362 A * 7/1991 Da Silva ............. B01F 3/04262
                                                           210/767
5,593,590 A    1/1997 Steyskal
(Continued)

FOREIGN PATENT DOCUMENTS

CA         2416690         8/2008
CA         2799408 A1      11/2011
(Continued)

OTHER PUBLICATIONS

Constantine, Tim. "North American Experience with Centrate Treatment Technologies for Ammonia and Nitrogen Removal", 2006 WEFTEC Conference, pp. 5271-5281.

*Primary Examiner* — Wayne Langel (57) ABSTRACT

An apparatus for recovering nutrients or water from digestate comprises one or more solid-liquid separation units, an ammonia stripping device, and a gas scrubbing unit. In a process, digestate is separated into a solids portion and a liquid portion. Ammonia is stripped from the liquid portion and converted into an ammonium salt solution which may be sold or used as, or blended with, a fertilizer product. Optionally, at least part of the remaining liquid portion may be concentrated to produce brine. The brine is mixed with the solids portion. The mixture may be dried and used as, or blended with, a fertilizer product. Optionally, a least part of
(Continued)

the remaining liquid portion may be re-used as dilution water in a digester. A solids portion of the digestate, and one or both of an ammonium salt solution and a brine, may be used as fertilizer without thermal drying.

9 Claims, 6 Drawing Sheets

Related U.S. Application Data (60) Provisional application No. 61/810,088, filed on Apr. 9, 2013.

(51) Int. Cl.

| | |
|---|---|
| *C02F 11/04* | (2006.01) |
| *C05F 11/06* | (2006.01) |
| *C05F 3/00* | (2006.01) |
| *C05F 7/00* | (2006.01) |
| *C05F 9/00* | (2006.01) |
| *C05B 17/00* | (2006.01) |
| *C01C 1/242* | (2006.01) |
| *C01C 1/10* | (2006.01) |
| *C05F 17/00* | (2006.01) |

(52) U.S. Cl.
CPC .......... *C05B 17/00* (2013.01); *C05F 17/0018* (2013.01); *C05F 17/0027* (2013.01); *C05F 17/0045* (2013.01); *C05F 17/0054* (2013.01); *C02F 11/12* (2013.01); *C02F 11/121* (2013.01); *C02F 2209/14* (2013.01); *C02F 2303/02* (2013.01); *Y02P 20/145* (2015.11); *Y02W 10/23* (2015.05); *Y02W 30/43* (2015.05); *Y02W 30/47* (2015.05)

(56) References Cited

U.S. PATENT DOCUMENTS

| | | |
|---|---|---|
| 6,299,774 B1 | 10/2001 | Ainswirth et al. |
| 6,368,849 B1 | 4/2002 | Norddahl |
| 6,464,875 B1 | 10/2002 | Woodruff |
| 6,569,332 B2 | 5/2003 | Ainsworth et al. |
| 6,692,642 B2 | 2/2004 | Josse et al. |
| 6,866,779 B1 | 3/2005 | Burke |
| 6,984,323 B2 | 1/2006 | Khudenko |
| 7,014,768 B2 | 3/2006 | Le et al. |
| 7,153,427 B2 | 12/2006 | Burke |
| 7,416,644 B2 | 8/2008 | Bonde |
| 7,731,850 B2 | 6/2010 | Choi et al. |
| 7,806,957 B1 | 10/2010 | Burke |
| 7,927,491 B2 | 4/2011 | Kotelko et al. |
| 8,470,567 B2 | 6/2013 | Facey et al. |
| 9,045,355 B2 * | 6/2015 | Kumar ................ C05F 17/0018 |
| 2006/0006055 A1 | 1/2006 | Bonde |
| 2007/0297953 A1 | 12/2007 | Kemp et al. |
| 2010/0170845 A1 | 7/2010 | Baur |
| 2014/0033776 A1 | 2/2014 | Josse et al. |
| 2014/0144195 A1 | 5/2014 | Callendrello et al. |
| 2014/0157846 A1 * | 6/2014 | Jeppson .................... C02F 1/66 |
| | | 71/54 |

FOREIGN PATENT DOCUMENTS

| | | |
|---|---|---|
| WO | 2012109737 A1 | 8/2012 |
| WO | 2013091094 A1 | 6/2013 |

\* cited by examiner

NUTRIENT RECOVERY PROCESS

RELATED APPLICATIONS

This application claims priority from U.S. application Ser. No. 13/832,737 filed on Mar. 15, 2013; claims priority from, and the benefit of, U.S. provisional application No. 61/810,088 filed on Apr. 9, 2013; and, claims priority from International Application Number PCT/CA2012/050907 filed on Dec. 18, 2012, all of which are hereby incorporated by reference.

FIELD

This specification relates to anaerobic digestion, to the recovery of nutrients from waste biomass, to a fertilizer product, and to removing ammonia from water.

BACKGROUND

The following discussion is not an admission that anything discussed below is common general knowledge or citable as prior art.

Various organic waste products contain nutrients that make the waste potentially valuable as fertilizer. For example, some animal manures and organic sludges or slurries could be applied directly to land. However, due for example to the large quantities of material involved relative to the nutrient content, and potential problems with odors, this practice is limited to selected appropriate operations located near the source of the waste. The manure, sludge or slurry might be treated to remove large fibers, physically dewatered, partially dried thermally, extruded into a solid fertilizer product and then further thermally dried. However such a product would not be stable and would tend to decompose or attract mold during storage because of its high biodegradable organic matter content. Alternatively, manures, sludges or slurries could be digested in an anaerobic digester to produce a biogas. The digested sludge could then be applied to the land as a fertilizer. While the biogas produced is useful as a fuel, use of the digester sludge as a fertilizer is still limited to selected appropriate operations near the source of the waste.

In an activated sludge wastewater treatment plant, ammonia is removed from the wastewater at least in jurisdictions with relevant discharge regulations. In these plants, waste activated sludge may be sent to an anaerobic digester. Sludge from the digester, comprising digestate, is typically de-watered before it is disposed or treated further. The liquid stream from the de-watering device, which may be called reject water, centrate or filtrate, is often returned to the main activated sludge process. This centrate contains ammonia, and there have been some attempts to remove ammonia from the centrate before it is sent back to the main process. A paper by Tim Constantine, presented at the 2006 WEFTEC conference and entitled "North American Experience with Centrate Treatment Technologies for Ammonia and Nitrogen Removal", provides a summary of ammonia removal technologies that have been used in North American facilities.

US Patent Application Publication Number 2007/0297953 to Kemp et al. describes a system in which ammonia is removed from water in a vacuum assisted flash stripping tower. The water is treated before stripping to remove solids and multivalent cations and increase its pH.

U.S. Pat. No. 7,416,644 to Bonde describes a fermenter with a side stream ammonia stripping step. Ammonia is stripped from fermented biomass in a shunt. Effluent from the fermenter passes through the shunt while water vapor is injected into the shunt.

INTRODUCTION TO THE INVENTION

The following paragraphs are intended to introduce the reader to the more detailed description to follow, and not to limit or define any claimed invention.

In some applications of anaerobic digestion, the feedstock is rich in nutrients such as Nitrogen (N), Phosphorus (P) and Potassium (K). Nutrients within the feedstock are maintained through the digestion process. The nutrients are concentrated on a dry mass basis in the digester sludge, alternatively called digestate herein, because a portion of the volatile solids in the feedstock is consumed by anaerobic bacteria and converted into biogas. However, a portion of the nutrients in the digestate is in the form of minerals or salts. For example, nitrogen is mostly contained as organic nitrogen in the feedstock but a large fraction of the nitrogen in the digestate is in the form of ammonia.

Anaerobic digester sludge is more stable than the undigested feedstock because it has a reduced concentration of biodegradable solids. Nevertheless, anaerobic digester sludge contains carbon and nitrogen, among other nutrients, in mineralized and organic forms that are useful as fertilizer. However, the nitrogen exists primarily in aqueous forms of ammonia. A typical digester sludge dewatering process would therefore lose much of the ammonia with removed water. Further, the liquid in the digested sludge also has a high pH and is heavily buffered with alkalinity. Heating the de-watered sludge cake under typical sludge drying temperatures, given its high pH, would convert the ammonia remaining in the liquid in the cake primarily into ammonia gas, resulting in more loss of ammonia along with the evaporated water.

This specification describes a process and apparatus for recapturing one, or optionally more, nutrients contained in the feedstock in a form that is usable, for example as fertilizer. The nutrients are preferably concentrated in the recaptured form. This specification also describes a process and apparatus wherein a liquid fraction of digestate is treated and recycled to the digester.

An apparatus for recovering nutrients from digestate comprises one or more solid-liquid separation steps, an ammonia stripping device and an adsorption column. The apparatus may optionally have one or more of a drier, a distillation column and an evaporator. In another option, the apparatus has a recycle from the ammonia stripping device to a digester. In a process, digestate is separated into a solids portion and a liquid portion. Ammonia is stripped from the liquid portion and converted into an ammonium solution or salt. Optionally, some or all of the remaining liquid portion may be concentrated or recycled to the digester. The concentrated liquid, if any, is mixed with the solids portion. The mixture may be used as, or blended with, a fertilizer product. In another option, the ammonium solution may be concentrated, for example in a distillation column, or added to the solids portion.

In a process and apparatus described herein, a liquid produced by dewatering the digestate is collected and processed in an ammonia recovery system. An ammonium salt solution is produced. The remaining liquid may be recycled to the digester without causing ammonia inhibition in the digester and thereby reducing the water feed and waste flow rates of the digester.

A device and process for removing ammonia from a liquid are described herein. The ammonia flows through a series of sequential stages. Bubbles, for example of air, are provided in the liquid in the stages. A mixed gas flow is further processed in an adsorption column to produce an ammonium salt solution, for example an ammonium hydroxide solution. The ammonium hydroxide solution is concentrated in a distillation column. The device and process for removing ammonia can be used in the systems and processes described above. Alternatively, the device and process for removing ammonia can be used in other applications, for example removing ammonia from municipal wastewater plant digester centrate or other waste streams with ammonia.

DETAILED DESCRIPTION

Figure 1:
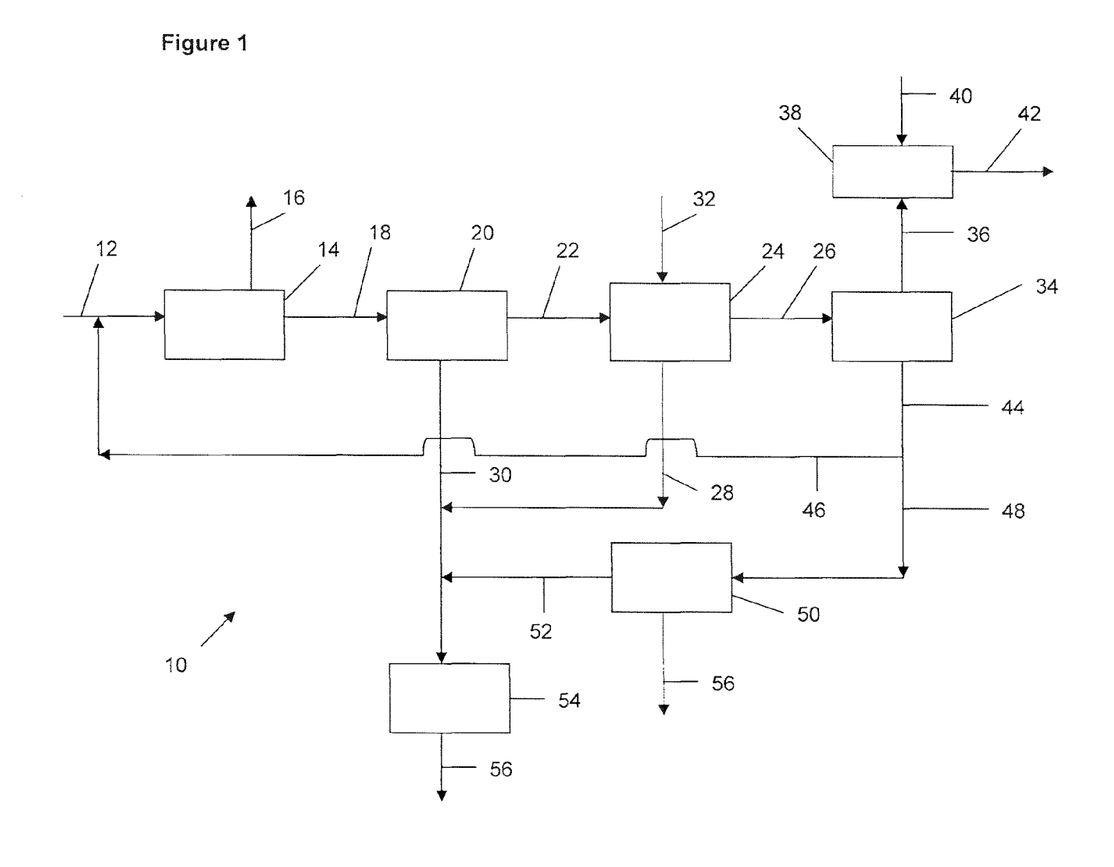
FIG. 1 is a schematic process flow diagram of a system for treating a feedstock with nutrient recovery.

FIG. 1 shows a system 10 for treating a feedstock 12. The feedstock 12 is typically a waste biomass. The feedstock 12 is treated first in an anaerobic digester 14. The digester 14 converts the feedstock 12 into biogas 16 and digestate 18. Biogas 16 may be used, typically after upgrading, in the system 10 or after being transferred out of the system 10. Examples of suitable feedstock 12 that result in high nutrient content digestate 18 include animal manure, post-consumer food waste, pre consumer food processing waste, biofuels processing by products, agricultural waste, and municipal wastewater sludge, among others. International Publication WO 2012/109737 is incorporated by reference.

The biogas 16 may be flared but it is preferably sent to a biogas processing unit to produce one or more of gas products, heat or power. The biogas processing unit may include one or more treatment units to upgrade the biogas. For example, the biogas may be treated to remove water vapour, particulates, ammonia or carbon dioxide. The biogas may be upgraded further for injection into a natural gas pipeline, or otherwise used as a replacement for natural gas. Alternatively, the biogas may be burned on site to create heat, electricity or both. For example, the biogas may be burned in a turbine or other engine of a combined heat and power unit. Heat produced from the biogas may be used in the system 10, for example to heat the anaerobic digester 14, to heat a liquid portion of digestate to be stripped of ammonia, or for other purposes. Electricity produced from the biogas may be used in the system 10, for example to power pumps or mixers in the anaerobic digester 14.

The digester 14 can have one or more closed tanks, in series or in parallel or both, with mixers. The digester 14 is preferably operated, for example, by using a high solids feedstock (for example 8% total solids or more) or recuperative thickening or both, such that the digestate 18 has a high total solids (TS) concentration, for example between 5% and 9%. The total suspended solids (TSS) concentration of the digestate 18 may be about 3-5%.

Mixing in the digester tank is affected by the solids content and viscosity of the digestate 18 in the tank. For example, increasing the solids content from 2.5% to 5% will usually result in a ten-fold increase in viscosity. Operating at a 5 to 6% TS content results in a viscosity of 5 to 7 Pa·s (5,000 to 7,000 cP). Digestate 18 with this viscosity cannot be properly mixed with common mixing systems such as top entry, jet, draft tube, linear or gas mixers. The high viscosity and, optionally, operating temperature (about 38 degrees C. if mesophilic or about 55 degrees C. if thermophilic) also makes electric submersible mixers inadequate as the electric motors tend to overheat. Installing electrical equipment inside a digester tank may also create risks of explosion associated with biogas 16 in the headspace of the digester 14.

Mixing is preferably done with high torque, low speed submersible mixers. UTS Products GmbH in Lippetal, Germany manufactures high solids content submersible mixers driven by a hydraulic motor. These mixers are controlled through service boxes. The service boxes have a skirt designed to selectively isolate the service box from the digester tank headspace. This allows safe mixer servicing without the need to empty the digester tank or stop operation. The service boxes are installed in the digester cover, one on top of each mixer column guide, to access the mixers for service and to enable repositioning or removal of the mixers. Fixed digester covers or double membrane covers are preferred when using the service boxes. Each mixer uses a 22 kW external hydraulic power unit and circulates biodegradable hydraulic oil. If leaks occur inside the digester then the bacteria can degrade the non-toxic leaked oil.

Usually two or more mixers are needed per digester tank, depending on the digester tank dimensions. The mixers are located near the tank perimeter and directed to create a rotational movement of the digestate and also to reintroduce floating layers or crusts back into the bulk of the digestate. The UTS hydraulic power units have the ability to drive up to 5 mixers. The mixers have automatic rotation reversal if a sudden torque increase is detected, which could be attributed to rags or an accumulation of hair or other fibers in the mixer blades. The vertical supporting columns of the mixers allow flexibility in directing and positioning the mixers so that the mixing energy can be effectively used.

Mixing is done intermittently, usually 20% of the time. Typical mixing intervals are 10 minutes ON and 40 minutes OFF, although other cycles can be used. Continuous mixing is unnecessary and more energy consuming. Further, propionate inhibition can occur with constant mixing in both mesophilic and thermophilic digesters.

The anaerobic digester 14 contains microorganisms, primarily bacteria, to digest the feedstock 12 to produce biogas 16 and digestate 18. With a mixed tank digester 14, the digestate 18 removed has about the same solids content as digestate in the tank of the anaerobic digester 14. Preferred hydraulic retention time (HRT) and solids retention time (SRT) depend on the degradability of the feedstock 12. SRT is typically over 25 days. The HRT can be as short as 3 hours for mostly soluble COD or up to 3 days for feedstock 12 with high TSS content.

The anaerobic digester 14 is preferably heated to maintain the temperature in a mesophilic or thermophilic range. Heating may be done using a recirculating sludge loop from the anaerobic digester, into a heat exchanger, and back to the anaerobic digester 14. External tube-in-tube or double spiral heat exchangers may be used. Due to the viscosity of the digestate 18, tube-in-tube exchangers require large passages to reduce head losses and facilitate cleaning, and also require internal static flow deflectors in the sludge side to promote sludge turbulence and increase heat transfer efficiency. This type of tube-in-tube exchanger is available from a few manufacturers and is preferred over spiral exchangers, which usually are more costly and have higher friction losses. The recirculating loop uses a positive displacement pump operated with continuous or intermittent pumping. The recirculating loop preferably has an in line grinder to reduce the risk of a heat exchanger plugging with rags or fibers.

The digestate 18 may be pumped continuously through the heat exchanger while hot water is pumped through the exchanger as needed to maintain the desired temperature. In this case, temperature control is done on the hot water side of the heat exchanger, automatically introducing new hot water when needed by means of a temperature control valve. Hot water from a boiler or waste heat from burning biogas 16 may be used to heat the digestate 18.

The nutrient recovery apparatus to be described below could be located separately from the anaerobic digester 14. However, when the nutrient recovery apparatus is co-located with the anaerobic digester 14 the need to move digestate 18 is reduced, the biogas 16 or waste heat from power generation can be used in the nutrient recovery process, and a liquid stream may be advantageously returned to the anaerobic digester 14.

The digestate 18 passes through at least one, but preferably two, solids separation stages. In the system 10, a first solid-liquid separation device 20 removes fibrous materials from the digestate 18. For example, the first solid-liquid separation device 20 may be a filter screw press, a screen or roller press, or another mechanical dewatering device. The first solid-liquid separation device 20 may have openings larger than 400 microns but smaller than 1000 microns. Filtrate 22 from the first solid-liquid separation device 20, alternatively called a reject, filtrate, centrate or pressate, may contain about 2 to 3 wt % total suspended solids (TSS) or more. The first solid-liquid separation device 20 may optionally be omitted if there is not a significant concentration of fibrous solids in the digestate 18.

The first solid-liquid separation device 20 also produces fibrous solids 30. The fibrous solids 30 contains fibers and large particles retained by the first solid-liquid separation device 20 and a small fraction of small particles in the digestate 18, including some anaerobic bacteria, that independently would have passed the screen based on size but became trapped and entrained in the larger particle and fiber matrix. Fibrous solids 30 solids content may range, for example, from 15 to 35%.

The filtrate 22 goes to a second solid-liquid separation device 24. The filtrate 22 may have, for example, 1 to 5% total solids content. The second solid-liquid separation device 24 may be, for example, a centrifuge, flocculating screw press, or similar device. A preferred second solid-liquid separation device is a sludge screw thickener, alternatively called a sludge screw dewaterer, described in detail further below in relation to FIGS. 4 and 5. One or more polymeric or mineral coagulants or flocculants may be added to the second solid-liquid separation device 24. Second filtrate 26 exiting the second solid-liquid separation device 24 preferably contains 0.2 wt % TSS or less. A cake 28, for example at about 20-25% solids, produced by the second solid-liquid separation device 24 is combined with fibrous solids 30 removed in the first solid-liquid separation device 20. The combined solids 28, 30 are rich in phosphorus and organic nitrogen, whereas the second filtrate 26 contains nitrogen (as ammonium) and potassium, both in solution. The second filtrate 26 may have 2,500-5,000 mg/L of ammonia; 2,000-4,000 mg/L of phosphorous; and, 40,000 to 60,000 mg/L of potassium.

Ammonia nitrogen is removed from the second filtrate 26 and optionally concentrated to produce a nitrogen rich fertilizer product. The relative concentration of ammonia ($NH_3$ gas) and ammonium ($NH_4+$ ion in solution) in the liquid of the digestate 18 is a function of pH and temperature. A larger fraction is present as unionized ammonia ($NH_3$ gas) with increased temperature and with increased pH.

The second filtrate 26 passes through an ammonia stripper 34. In one example, the second filtrate 26 is heated, for example to 60 to 80 degree C., and flows through one or more tanks or zones, for example 3 to 5 heat jacketed reactors, in series. Sub-surface low pressure air is bubbled into the heated second filtrate 26. In cold climates the subsurface air can be heated prior to entering the ammonia stripper 34. The air bubbles and elevated temperature first strips $CO_2$ from the second filtrate 26 resulting in a pH increase. The pH increase and elevated temperature in turn result in ionized ammonium in solution shifting to unionized ammonia gas. The elevated temperature also reduces ammonia solubility. Continued air bubbling then strips ammonia gas out of solution and into a mixed gas stream 36 comprising ammonia gas, air and evaporated moisture. The ammonia stripper 34 will be described in detail below in relation to FIG. 3.

The mixed gas stream 36 flows to a gas scrubbing unit 38 in which ammonia is scrubbed from the mixed gas stream 36. The gas scrubbing unit 38 uses an adsorption liquid 40 with an acid such as sulfuric acid or alternatively water alone. The adsorption liquid 40 reacts with the ammonia gas and forms an ammonium compound solution 42. The ammonium compound in solution 42 is ammonium sulfate when sulfuric acid is used as the adsorption liquid and ammonium hydroxide when water is used as the adsorption liquid 40. The ammonium compound solution 42 is a usable nutrient product in liquid form at 28 to 40 wt % concentration. Alternatively, the ammonium compound solutions 42 can be further concentrated or dried to produce a crystal or salt form of the ammonium compound. The ammonium compound solution 42 can be used as a fertilizer product alone or in combination with other products.

In one example, the gas scrubbing unit 38 uses a counter flow column configuration with mixed gas stream 36 circulating from the bottom up through a packed bed. The packed bed may use a plastic or other media to enhance the gas to liquid mass transfer surface area. A liquid shower of adsorption liquid 40 flows from the top down through the packed be and reacts with the ammonia gas in the mixed gas stream 36 to form the ammonium compound solution 42. Ammonium compound solution 42 is collected in a sump at the bottom of the scrubber column. Optionally, ammonium compound solution 42 is pumped from the sump for recirculation through the packed bed. New adsorption liquid 40 is added to the circulating ammonium compound solution 42 and a balancing flow of ammonium compound solution 42 is removed from the sump below the packed bed. The adsorption liquid 40 addition rate may be controlled automatically based on a pH set point in the sump.

In the case of making an ammonium sulfate solution, excess sulfuric acid in the adsorption liquid 40 can be used to produce an acidic ammonium sulfate solution to reduce ammonia volatilization in any drying or composting steps. Alternatively, sulfuric acid can be added to the product ammonium compound solution 42 for the same purpose. Optionally, an ammonium sulfate solution may be further concentrated, for example to 35 to 45%, for example using flash distillation with vacuum, heat, or a gas permeable membrane. Acetic acid, citric acid or another acid may be used in place of sulfuric acid in the adsorption liquid 40 or added to the product ammonium compound solution 42. The salt produced in the ammonia recovery system may be, for example, ammonium sulfate, ammonium acetate or ammonium citrate, depending on the acid used. However, ammonium sulfate in particular is accepted as a useful fertilizer.

A stripped filtrate 44 leaves the ammonia stripper 34. The stripped filtrate may still have 2,000-4,000 mg/L of phosphorous and 40,000 to 60,000 mg/L of potassium, although the concentrations are increased slightly compared to the second filtrate 26. The ammonia concentration, however, is typically reduced to under 1000 mg/L. Part of the stripped filtrate 44 can be used as dilution water 46, optionally after being de-aerated. Dilution water 46 is mixed with the feedstock 12. In the mesophilic and thermophilic range of digesters, operating at 35 to 55 degrees Celsius and at a pH of between 7.5 and 8.2, most of the reduced nitrogen exists as ammonium ions. Total ammonia concentrations are typically not allowed to exceed about 5000 ppm in mesophilic digesters and about 3000 ppm in thermophilic digesters since the unionized ammonia fraction is toxic to methanogenic organisms. Therefore digesters for manures with high solids and high nitrogen content, such as digesters for poultry manure, are typically diluted.

Phosphorus and potassium that was not retained in the combined solids 28, 30 remains in stripped filtrate 44 and can be partially returned to the digester 14 in the dilution water 46. However, in the example of system 10, not all of the stripped effluent 44 is required for dilution water 46. Phosphorus and potassium is recovered from the excess filtrate 48 by blending the excess filtrate with the combined solids 28, 30.

Excess filtrate 48 preferably passes through a concentrator 50 before being mixed with the combined solids 28, 30. The concentrator 50 reduces the amount of water added to the combined solids 28, 30 while retaining phosphorus and potassium. Concentrated filtrate 52 leaving the concentrator 50 may be concentrated 6 or 7 times or more. The concentrated filtrate 52 may have a solids content of 20 wt % or more. The concentrator 50 may be, for example, one or more thermal evaporators. Thermal energy for evaporation can be supplied in a variety of ways such as burning natural gas or biogas 16. The concentrator 50 is preferably a multiple effect evaporator such that waste heat can be used to provide some of the thermal energy for drying combined solids 28, 30. Waste heat may be taken from a combined heat and power unit burning the biogas 16, or exhaust from a dryer 54 used to dry the combined solids 28, 30 and concentrated filtrate 52 mixture. The concentrator 50 also produces an effluent 56, for example by condensing steam produced by evaporating the excess filtrate 48. Effluent 56 may be discharged or used in another device or process, optionally after further treatment steps. Alternatively, effluent 56 may be used for dilution water in the anaerobic digester 14.

The combined solids 28, 30 and concentrated filtrate 52 are sent through a drier 54 to remove moisture, preferably to a TS concentration of 80% or more, for example about 90%. Drier 54 is preferably an indirect drier. The drier 54 can be, for example, a hollow screw type dryer with steam or hot oil circulation, a disc type dryer or a press type dryer, etc. The drier 54 may use, for example, biogas 16, natural gas or electricity as an energy source to evaporate water from the combined solids 28, 30 and concentrated filtrate 52. The drier 54 may operate at a temperature of 100 degrees C. or more. The dried product 56 is rich in phosphorus and potassium as well as non-volatile carbon. The dried product 56 can be used as a fertilizer alone, or in a mixture with another fertilizer product. Optionally, the combined solids 28, 30 may be dried before the concentrated filtrate 52 is added with the combined solids 28, 30 then re-dried or not before use.

Alternatively, the combined solids 28, 30 may also be mixed with the ammonium compound solution 42. In this case, to avoid driving ammonia gas from the ammonium compound solution 42, the combined solids 28, 30 are dried, for example as described above, before the ammonium compound solution 42 is added. Adding the ammonium compound solution 42 after drying the combined solids 28, 30 avoids driving ammonia gas out of the ammonium compound solution 42 during the solids drying process. Optionally, the combined solids 28, 30 may be re-dried after the ammonium compound solution 42 is added, preferably at ambient to moderate temperatures, for example by a flow of warm air over the combined solids 28, 30. Since the ammonium compound solution 42 has a higher ammonia concentration, reduced alkalinity and reduced pH relative to the digestate 18, some drying after the ammonium compound solution 42 is added can be tolerated with minimal gaseous ammonia discharge, and with most of the ammonia left as an ammonium salt mixed with the combined solids 28, 30. Alternatively, the combined solids 28, 30 with the ammonium compound solution 42 added may be used without thermal drying, for example without drying by way of heating to 50 degrees C. or more or 100 degrees C. or more. In a further alternative, the combined solids 28, 30 may be made into a pellet or flake form fertilizer, with one or both of concentrated filtrate 52 and ammonium sulfate solution 42 added, as described in PCT application CA2012/050907 filed on Dec. 18, 2012, which is incorporated by reference. The combined solids 28, 30 may also be dried in an enclosed dryer with ammonia gas recapture as described in PCT application CA2012/050907. In a further alternative, the combined solids 28, 30 are not thermally dried. Instead, the combined solids 28, 30, with one or both of concentrated filtrate 52 and ammonium compound solution 42 added, are used as a fertilizer at the solids content produced by the solid-liquid separation devices 20, 24. This avoids a loss of ammonia gas from the combined solids 28, 30 during drying. Optionally, the cake 28 or fibrous solids 30 alone may be mixed with the ammonium compound solution as described for the combined solids 28, 30. The remaining solids may be used as a fertilizer, for compost, as animal bedding or for any other appropriate use.

Figure 2:
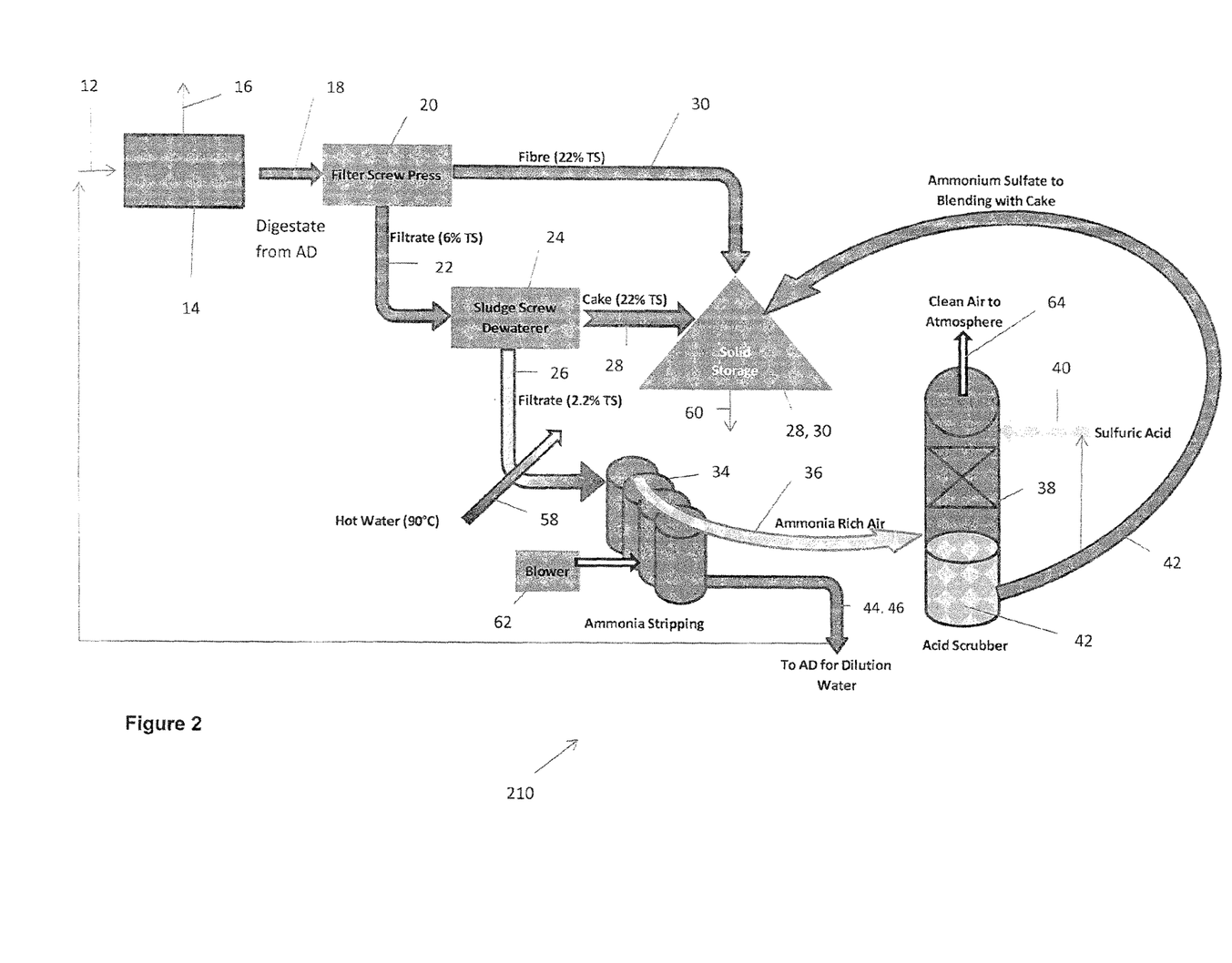
FIG. 2 is a schematic process flow diagram of another system for treating a feedstock having increased digestate liquid fraction recycle relative to FIG. 1.

FIG. 2 shows a second system 210 which is a design example of one particular system used for treating chicken litter. Second system 210 has many components that are the same as, or similar to, components given the same reference numeral in the system 10. Where the same reference numeral is used in the second system 210, the description from the system 10 applies unless it is inconsistent with the description of second system 210 below. In the second system 210 as described below, the anaerobic digester 14 is fed exclusively chicken litter from layer operations. However, the second system 210, or parts of it, may be used with other feedstocks 12 as well.

The litter arrives as a dry (30% TS) product that must be diluted before being fed to the anaerobic digester, which operates at a mesophilic temperature. In order to reduce the consumption of water, the discharge of wastewater, or both, all of the stripped filtrate 44 is used as dilution water 46.

Referring to Table 1, the chicken litter is very high in total nitrogen and also ammonia nitrogen. When nitrogen accumulates in an anaerobic digester, the digestion process may become inhibited by ammonia toxicity. It is particularly the gaseous ($NH_3$) form of ammonia that is toxic. Accordingly, stripped filtrate 44, rather than second filtrate 26, is used as dilution water 46 to limit the accumulation of nitrogen in the anaerobic digester. Essentially all, for example 80% or more, of the stripped filtrate 44 may be returned to the anaerobic digester. In this example, all of the stripped filtrate 44 is recycled to the digester 14. With all of the stripped filtrate 44 recycled, the total solids and ammonia concentrations in the digester 14 are acceptable and the resulting process then has no liquid discharge.

TABLE 1

Chicken litter components

| Parameter | Average |
|---|---|
| pH | 7.64 |
| $NH_4$ (%) | 0.97 |
| TN (%) | 1.27 |
| TS (%) | 28.55 |
| VS (%) | 20.37 |
| $CaCO_3$ (%) | 9.04 |
| Carbon (%) | 46.70 |
| Fibre (%) | 3.75 |
| Moisture (%) | 71.45 |
| Ash (%) | 8.19 |
| Fat (%) | 1.79 |
| Protein | 7.93 |

Filtrate 22 has about 6% TS. The second filtrate 26 has about 2.2% TS. The second filtrate 26 is preferably heated before it enters the ammonia stripper 34. The second filtrate 26 may be heated by passing it through a heat exchanger with hot water 58 at, for example, 90 degrees C. The hot water 58 may be heated by waste heat, for example from a combined heat and power unit burning biogas 16 from the anaerobic digester 14. No added chemicals are required in the ammonia stripper 34.

To recover the ammonia in the second filtrate 26, and due to the high odour potential associated with ammonia, the mixed gas stream 36 is preferably not directly released to atmosphere. Instead, the mixed gas stream 36 is acid scrubbed in the gas scrubbing unit 38. Acid in the adsorption liquid 40 forms a soluble salt with the ammonia, thus neutralizing and preventing the subsequent release of ammonia gas. Most typically sulfuric acid is used as the absorbent due to its low cost, abundant availability, relative safe handling and also the useful end product of ammonium sulfate in the ammonium compound solution 42.

Preferably, the ammonium compound solution 42 is sold, for example for use in making an industrial chemical or fertilizer. For example, ammonium sulfate solution produced in the gas scrubbing unit 38 can have up to a concentration of 38% $(NH_4)_2SO_4$ or more. This is equivalent to a fertilizer product with 8% nitrogen. Ammonium hydroxide may be sold for making industrial chemicals.

In the case of the second system 210, there is no available and economically viable local market for the ammonium compound solution 42. An alternative, as shown, is to produce an ammonium sulfate solution 42 and blend it into the combined solids 28, 30 which are used to create compost. This augments the nutrients in the final compost product 60 which can be used as a fertilizer.

In the second system 210, digestate 18 from the anaerobic digester 14 is removed periodically and sent to the first solid-liquid separation device 20. The first solid-liquid separation device 20 is preferably a filter screw press which removes coarse material, in particular fibres and feathers. The second solid-liquid separation device 24 is preferably a sludge screw dewaterer which removes suspended solids and fine material through the use of flocculating polymer. Pressure is applied to the flocculated material and a sludge cake 28 is discharged.

The first solid-liquid separation device 20 is desirable because the incompressible material in the digestate 18 is abrasive and would rapidly deteriorate the second solid-liquid separation device 24. Furthermore, the first solid-liquid separation device 20 requires no polymer or other flocculant and therefore can significantly reduce the total flocculant consumption of the solid-liquid separation devices 22, 24. The fibrous solids 30 and the cake 28 both have total solids (TS) concentrations of approximately 22%.

The second filtrate 26 is sent to the ammonia stripper 34. The second filtrate 26 is first heated to increase the efficiency of ammonia stripping. Air is passed through the ammonia stripper 34 and first $CO_2$ is stripped. The decarbonisation increases the pH of the second filtrate 26 which further increases the efficiency of the ammonia stripping process. Still more air is added to the ammonia stripper 34 and by the end of the treatment 80-90% or more of the ammonia may be removed.

The mixed gas stream 36 is rich in ammonia, for example at about 2,800 $mg/Nm^3$. In many jurisdictions, this gas cannot be vented. The mixed gas stream 36 is sent to the gas scrubbing unit 38, for example an acid scrubber having a random packing material, mist eliminator and acid dosing. The mixed gas stream 36 enters the scrubber at the bottom and percolates up through a counter current flow of acid. The ammonia present in the mixed gas stream 36 reacts with the free sulfate anion and forms a soluble salt. The salt becomes entrained in the absorbent liquid. The blowdown from the scrubber may be maintained at about 30-40%, for example about 38%, $(NH_4)_2SO_4$ while fresh acid is added to the scrubbing liquid to maintain its absorbance.

Blowdown from the scrubber, which is ammonium compound solution 42, is an odourless liquid that is clear to faint yellow and has a pH between 3 and 5. The ammonium compound solution 42 is blended with the cake 28, which is not dried and has about 22% solids, and optionally with the fibrous solids 30, which is also not dried and has about 22% solids, to increase the fertilizer value of compost made from them. A paddle or ribbon mixer may be used. The fibrous solids 30 usefully absorb much of the ammonium compound solution 42. The quality of the combined solids 28, 30 with ammonium compound solution 42 added is presented in Table 2.

TABLE 2

Estimated nutrients in the combined solids 28, 30 after addition of ammonium salt solution 42

| Parameter | Dry Basis | Dry Basis (% of DS) | As produced (22% DS cake + 38% $(NH_4)_2SO_4$) |
|---|---|---|---|
| TKN | 330.4 kg/d as N | 3.6% as N | 0.84% as N |
| TP | 204.6 kg/d as P | 2.3% as P | 0.52% as P |
| TK | 331.9 kg/d as K | 3.7% as K | 0.85% as K |
| Sulfur | 252 kg/d as S | 2.8% as S | 0.64% as S |

The combined solids 28, 30 mixed with ammonium salt solution 42 may be applied directly to the land as fertilizer or first sent to a composting system. The acidic nature of the ammonium sulfate reduces the risk of ammonia release in the composting process.

In general, the ammonia stripper 34 may be contained in an enclosed vessel, for example a rectangular box, or a cylindrical vessel, and can operate with a low liquid level, for example 1 or 2 m of depth or less. The volume of the vessel may be such that it provides about 30 to 40, or even up to 70 minutes of hydraulic retention time based on filtrate throughput. The ammonia stripper receives subsurface diffused air through medium bubble diffusers, and optionally surface crossflow sweeping air. The ammonia stripper operates at above ambient pressure, for example 50 degrees C. or more, or about 70 degrees C. or more. Hot ammonia stripper effluent may pass through a heat exchanger with the influent. The influent may also be heated with waste heat from an engine operating on biogas or another heat source. The ammonia stripper operates with multiple stages, for example 3 to 5 stages. The stages may be divided with perforated baffles or by other means such as a weir or piped connection with flow between the stages by gravity. Bubble diffusers are placed in each stage and connected to a blower 62 (see FIG. 2). Optionally, an internal reservoir at the end of the ammonia stripper allows the effluent to de-aereate if required for pumping the effluent. A mechanical de-aerator may also be used if required.

The ammonia stripper can remove ammonia without adding chemicals for pH increase. At 70 degrees C., the diffused air drives carbon dioxide out of the liquid. Optionally, crossflow air introduced at the surface of the liquid further reduces the concentration of carbon dioxide in the headspace of the stripper which enables increased $CO_2$ stripping. The $CO_2$ is in the filtrate as ammonium bicarbonate which results from the digestion process and is in equilibrium with the high $CO_2$ content of the biogas in the digester headspace, usually 30 to 45%. Stripping raises the pH to 9.2 or higher. At this high pH and high temperature, the majority of the ammonia becomes unionized ammonia gas in the filtrate and is driven out of solution and into the stripper headspace by the subsurface diffused air.

The surface crossflow air, if any, reduces the ammonia concentration in the stripper headspace at the interface between water and air. This is an equilibrium reaction. The dilution of the headspace facilitates ammonia removal due to the higher concentration gradient between the liquid and the air above it. Gasses may be drawn out of the stripper headspace by a slight negative pressure created by an induced draft fan, optionally part of a downstream scrubber. In cold climates the subsurface air can be heated prior to entering the ammonia stripper. High temperature in the stripper helps prevent phosphate salts in the feed liquid from settling as the pH rises. Cooling the effluent after it exits the stripper allows these salts to be precipitated in a controlled location such as a storage tank. Precipitated salts can be separated from the effluent and, for example, added to one or more of the digestate solids.

Figure 3:
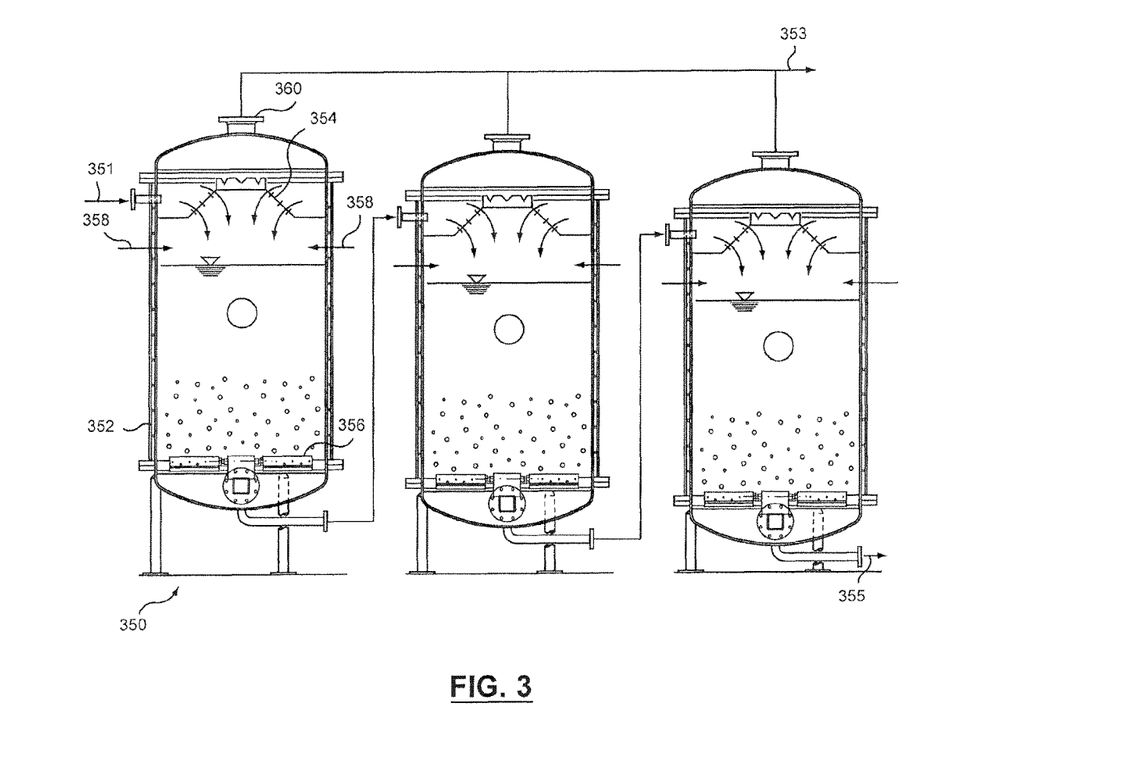
FIG. 3 is schematic partially cross-sectioned elevation view of system for removing ammonia from water having reactors in series.

FIG. 3 shows a preferred ammonia stripper 350 that may be used for the ammonia stripper 34 in the system 10 or second system 210. The stripper 350 has one or more jacket reactors 352. If there are multiple reactors 352, they are preferably connected in series with the liquid effluent from one being fed to the next. Stripper effluent 355, which may be stripped filtrate 44, is removed from the last reactor 352. The reactors 352 may be located at decreasing elevations in the direction of flow such that flow between them may be by gravity. Alternatively, the liquid may be pumped between them. The jacket reactors 352 have jackets around their outer walls allowing them to be heated, for example to about 50 degrees C. or more or about 70 degrees C. or more. Feed water 351, which may be for example second filtrate 26, enters each reactor 352 through a porous baffle 354 which breaks the feed flow up into multiple streams which fall through an air gap before reaching the surface of the liquid in the reactor. Air bubbles are produced in the liquid from a diffuser 356. Gas is collected in the head space of each reactor 352 and removed by connecting their gas outlets 360 to the suction side of a pump. The headspace of a reactor may be at a partial vacuum with the gas outlets 360 being the only gas openings. Optionally, a sweep gas may be added through one or more ports 358. In another option, the sweep gas may flow through one or more reactors in series by connecting the gas outlet 360 of an upstream reactor to the ports 358 of a downstream reactor. One or more of the outlets 360 are corrected to an outlet pipe 353 which may carry, for example, mixed gas stream 36.

The second solid-liquid separation device 24 operates at about a TSS recovery of 90% or more, preferably 95% or more. The second solid-liquid separation device 24 may be a drum, disc, or screw thickener (alternatively called a screw press, a sludge screw thickener or press or a rotary screw thickener or press). Other devices, such as clarifiers, dissolved or cavitation air flotation units, centrifuge thickeners, and membranes, are not useful for producing a digestate solids portion C with over 6% solids.

The second solid-liquid separation device 24 may have a screen or mesh having an opening size in the range of about 200 to 500 microns. Solids recovery is enhanced by adding a polymer to the filtrate 22 or into the second solid-liquid separation device 24. For example, polymer, typically in the form of a dilute solution, may be injected upstream of the second solid-liquid separation device. A high shear static mixer or mixing valve is used to disperse the polymer into the filtrate 22. Flocculation is done in the pipe between the pump and the second solid-liquid separation device 24. Typical polymer doses range from 4 to 6 kg per ton of solids.

A preferred second solid liquid separation unit 24 is an enclosed rotary screw thickener with an internal screw, designed to receive sludge with high initial solids content (3 to 7%). A suitable screw thickener is described in U.S. patent application Ser. No. 13/826,410 which is incorporated by reference. Such a screw thickener (alternatively called a screw press) has an auger shaft within a screening section, the auger shaft having an increased diameter towards an outlet end of the screw press. The screening section has openings sized to remove floc from sludge, for example 200 to 500 microns or wedgewire with a slot opening in the range from about 0.25 mm to about 0.75 mm. The screening section may be selectively fixed or allowed to rotate. A sprayer system can be used to spray water against the outside of the screening section. The screening section is cleaned periodically by spraying water against the screening section while rotating it. The screening section is enclosed.

A screw thickener generally as described in U.S. patent application Ser. No. 13/826,410 is available commercially from UTS. This thickener is enclosed, uses low energy, has low polymer demand and achieves high solids capture. It is designed to receive up to 5 to 7% solids influent and to produce a 12 to 25% solids effluent. Such a screw press, which may be used as the second solid liquid separation device 24, will be described further below with reference to FIGS. 4 and 5.

Figure 5:
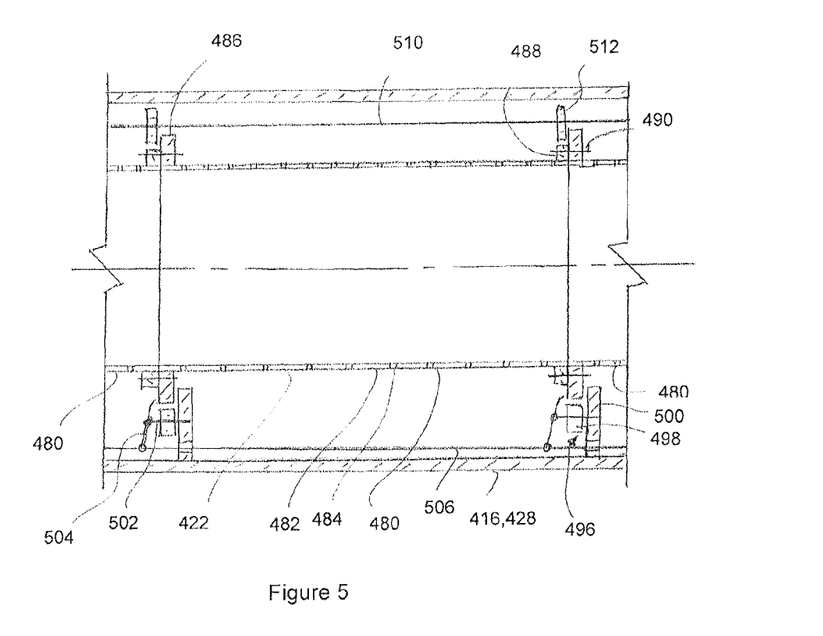
FIG. 5 shows a portion of the screening section of FIG. 1 with optional screening section mounts and restraints and optional drive mechanisms for rotating the screening body.

FIG. 5 shows a screw press 410 having an inlet end 406 and an outlet end 408. The screw press 410 has a cylindrical screening body 412 and a frame 416. The screening body 412 has a non-porous inlet section 420, a porous screening section 422 and a non-porous outlet section 424. The frame 416 similarly has an inlet portion 426, a central portion 428 and an outlet portion 430. The inlet portion 426 of the frame 416 may share components with or support the inlet section 420 of the screening body 412. The central portion 428 of the frame 416 at least partially surrounds the screening section 422 of the screening body 412. The outlet portion 430 of the frame 416 may share components with or support the outlet section 424 of the screening body 412.

The screw press 410 also has an auger 414 and a drive mechanism 418. The auger 414 is located within the screening body 412 and is supported by the frame 416. In particular, the auger 414 and screening body 412 are concentric about a central axis 432 of the screw press 410. One end of a shaft 460 of the auger 414 is supported through a bearing (not shown) on a stationary post 434 attached to the outlet portion 430 of the frame 416. The other end of the auger shaft 460 of the auger 414 is supported on a drive shaft 436 of the drive mechanism 418. A blade 458 of the auger 414 is attached in a spiral around the auger shaft 460 and extends towards, or optionally touches, the inside of the screening body 412. The drive mechanism 418 is attached to the inlet portion 426 of the frame 416 and comprises a motor 438 and a gearbox 440. The frame 416 is supported on the ground through a frame 441.

The inlet portion 426 of the frame 416 has an inlet 442 to receive a feed mixture 444 such as filtrate 22. The central portion 428 of the frame 416 has a liquid outlet 446 to discharge a liquid fraction 448, such as second filtrate 26, of the feed mixture 444. The outlet portion 430 of the frame 416 has a solids outlet 450 to discharge a solids fraction 452, such as cake 28, of the feed mixture 444. The liquid fraction 448 may have some solids remaining in it but at a reduced solids concentration relative to the feed mixture 444. The solids fraction 452 may have some liquid in it but at a higher solids concentration than the feed mixture 444.

In operation, the feed mixture 444 is pumped into the inlet 442 at an initial pressure. The drive mechanism 418 rotates the auger 414 causing the blade 458 to convey the feed mixture 444 along the screening body 412. The auger 414 preferably also increases the pressure of the feed mixture 444. Liquid and fine solids in the feed mixture 444 are forced through the screening body 412. These liquids and fine solids are collected in the central portion 428 of the frame 416 and discharged through liquid outlet 446. The remainder of the feed mixture 444 exits the screening body 412 after passing by a counter pressure cone 460. Counter pressure cone 460 is biased towards the screening body 412 by a biasing mechanism 462 such as a set of springs or a pneumatic cylinder. The solids fraction 452 drops from the end of the screening body 412 and is discharged from the frame 416 through the solids outlet 450.

The internal volume of the screening section 422 preferably decreases towards the outlet end 408 of the screw press 410. This helps maintain pressure in the screening section 422 even though the liquids fraction 448 is removed from the feed mixture 444. A decreasing volume may be obtained by reducing the diameter of the screening section 422. Alternatively, the pitch of the blades 458 may be decreased towards the outlet end 408 of the screw press. Both of these methods, however, prevent the use of a blade 458 having a uniform outer diameter and pitch, which is more easily manufactured to a tight fit with the screening section 422. In the screw press 410 of FIG. 4, a decreasing internal volume is provided by increasing the diameter of at least a portion of the shaft 460 towards the outlet end 408 of the screw press 410.

Figure 4:
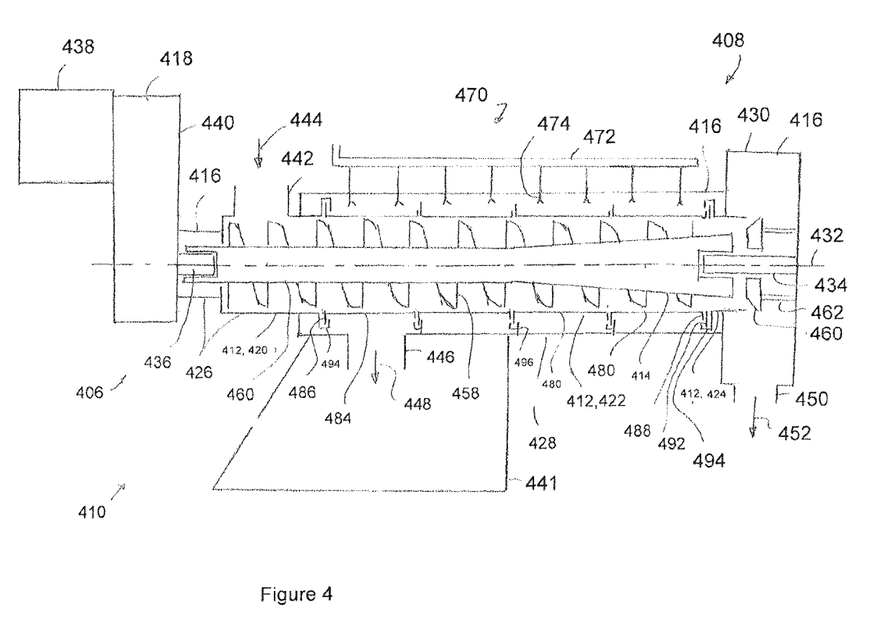
FIG. 4 shows a schematic cross sectional view of a screw press with a screening section.

The screening section 422 of the screening body 412 has openings of a size and shape adapted to provide a selected degree of separation. For example, the screening section 422 may have smaller openings suited to separating flocculated solids from the filtrate 22. For example, the screening section 422 may be made from wedgewire with a slot opening in the range from about 0.25 mm to about 0.75 mm. Alternatively, the screening section 422 may be made of other materials or have openings in the range of about 200 to 500 microns.

Although any screw press may benefit from having a convenient cleaning method, cleaning is required more frequently when the screening section 422 has small openings. In particular, when the screw press 410 is used to thicken sludge, dismantling the screw press 410 for cleaning is undesirable. The screw press 410 is fitted with a sprayer system 470 to allow cleaning by spraying water against the outside of the screening section 422. When cleaning is required, water is pumped through a manifold 472 to a series of sprayer heads 474 located inside of the central portion 428 of the frame 416. The screw press 410 of FIG. 4 has one manifold 472, but there may be multiple manifolds 472 spaced around the circumference of the screening body 412.

The water sprayed against the screening section 422 moistens and breaks up accumulations of solids caught in the openings of the screening section. Some of the water may also force its way through the openings of the screening section 422 in a reverse direction. The water is preferably heated. In order to assist the water in cleaning the screening section 422, the supply of feed mixture 444 may be stopped while the auger 414 continues to rotate for a period of time before the water is sprayed. This reduces the volume or pressure, or both, of the feed mixture 444 inside the screening section 422.

Referring to FIG. 5, the screening section 422 may be made up of screen panels 482 having openings 484. In the construction shown in FIG. 5, the screening section 422 is made up of segments 484 each having a cylindrical screen panel 482 attached to a forward flange 486 and a rearward flange 488. The screening section is built up by attaching the rearward flange 488 of one segment 484 to the forward flange 486 of another segment 484, optionally by way of fasteners 490. Other methods of constructing a screening section 422 may also be used.

Referring back to FIG. 4, a forward flange 486 at one end of the screening section 422 is held within a receiver 494 attached to the frame 416 through the inlet section 420 of the screening body 412. Alternatively, the receiver 494 may be attached directly to the frame 416. The receiver 494 contains a bearing, such as a brass or plastic ring or a race of ball bearings, and allows rotation of the screening section 422. Similarly, a receiver 494 is attached to the frame 416 and holds, but allows rotation of, the other end of the screening section 422. This second receiver 494 may hold a rearward flange 488 or a supplementary flange 492 fastened to a rearward flange 488. In this way, at least the screening section 422 of the screening body 412 is allowed to rotate about the central axis 432. Optionally, one or more non-porous parts of the screening body 412 may also be allowed to rotate. Optionally, intermediate bearing mechanisms 496 may be provided to support, but allow rotation of, the screening section 422.

Referring back to FIG. 5, each bearing mechanism 496 has a roller 498 supported through a post 500 by the frame 416. The roller 498 spins on an axle 502 supported by the post 500. Three or more bearing mechanisms 496 may be spaced around the circumference of the frame 416 at each longitudinal position shown in FIG. 4 to better support and center the screening section 422. A lever 504 supported on the end of an axle 502 is attached to an actuator 506. When the actuator 506 is moved to the left, the lever 504 bears against a forward flange 486. The lever 504 may apply friction to reduce the speed of rotation of the screening section 422 or to stop the screening section 422 from rotating. Moving the actuator 506 to the right lessens or removes the friction. Moving the actuator 506 even further to the right moves the lever 504 to the outside of the forward flange 486 so that the screening section 422 can be pulled out of, or inserted into, the frame 416.

An alternative mechanism for supporting or facilitating a desired rotation of the screening section 422 is shown at the top of FIG. 5. In this alternative, rearward flanges 488 are made in the form of ring gears. A gear shaft 510 supported by the frame 416 is fitted with gears 512 that engage the rearward flanges 488. The gear shaft 510 may be supported by the frame 416 at intermediate positions to allow the gears 512 to help support or center the screening section 422. Alternatively or additionally, the gear shaft 510 may be attached to a brake such that the gear shaft 510 can be used to stop or slow the rotation of the screening section 422. Alternatively or additionally, the gear shaft 510 may be connected to the gearbox 440 of the drive mechanism 518, or to a separate drive mechanism, so that the gear shaft 510 can be used to drive the rotation of the screening section 422.

When rotation of the screening section 422 is not restrained, the screening section 422 will tend to rotated with the auger 414 due to friction between the auger 414 and the screening section 422. Optionally, the screening section 422 may be forced to rotate with the auger 414 by actuating a releasable connection (not shown) between the auger 414 and the screening section 422. Alternatively, the screening section 422 may be driven by the drive mechanism 418 without applying force through the auger 414, for example by use of the gear shaft 510 of FIG. 5. In all of these examples, the motor 438 is used, directly or indirectly, to rotate the screening section 422. A separate motor may also be used to rotate the screening section 422. In some of the examples above, the screening section 422 may be rotated when the auger 414 is not rotating or at a different speed than the auger 414. In some other examples, such as applying some friction to the screening section 422 while the auger 414 is rotating, the screening section 422 can only be rotated while the auger 414 is rotated but the screening section 422 may rotate at a different speed than the auger 414.

The screening section 422 is preferably rotated while water is sprayed against it during the cleaning process described above. Rotating the screening section 422 allows each part of the screening section to pass under a line of sprayer heads 474. Multiple manifolds 472 are not required. Rotating the screening section 422 also allows each part of the screening section 422 to be placed at or near the top of the screening section 422 so that gravity may assist in the cleaning. Rotating the screening section 422 also avoids having the bottom of the screening section 422 accumulate solids that fall from upper parts of the screening section 422 during cleaning. Optionally, the screening section 422 may be stopped and the auger 414 may be rotated for a period of time during or after the cleaning procedure to convey backwashed solids out of the screening section 422. Alternatively, the auger 414 may be rotated at a faster speed than the screening section 422 during the cleaning process to convey material released during cleaning out of the screening section 422.

After the cleaning procedure, the screening section 422 is restrained from rotating, the auger 414 resumes or continues normal rotation, and the supply of feed mixture 444 is restarted. The screening section 422 is typically prevented from rotating during operation of the filter press 410 except when cleaning the screening section 422.

A rotary drum thickener might also be used, but is less desirable. In these, a screen drum rotates with internal welded flights moving the sludge forward as it drains. Some commercially available models can produce a solids content of 8 to 10%, but a solids content in the digestate solids portion C of over 12% is preferred. Rotary drum thickeners are also typically limited to a solids concentration of the influent of 3% or less. Rotary drum thickeners are also less efficient than rotary screw thickeners and are rarely enclosed. An enclosed device is preferred for odor control, since ammonia and hydrogen sulfide would otherwise escape to the atmosphere. Thickening centrifuges can also be used, but these are more costly than screw thickeners and require more energy to operate.

Figure 6:
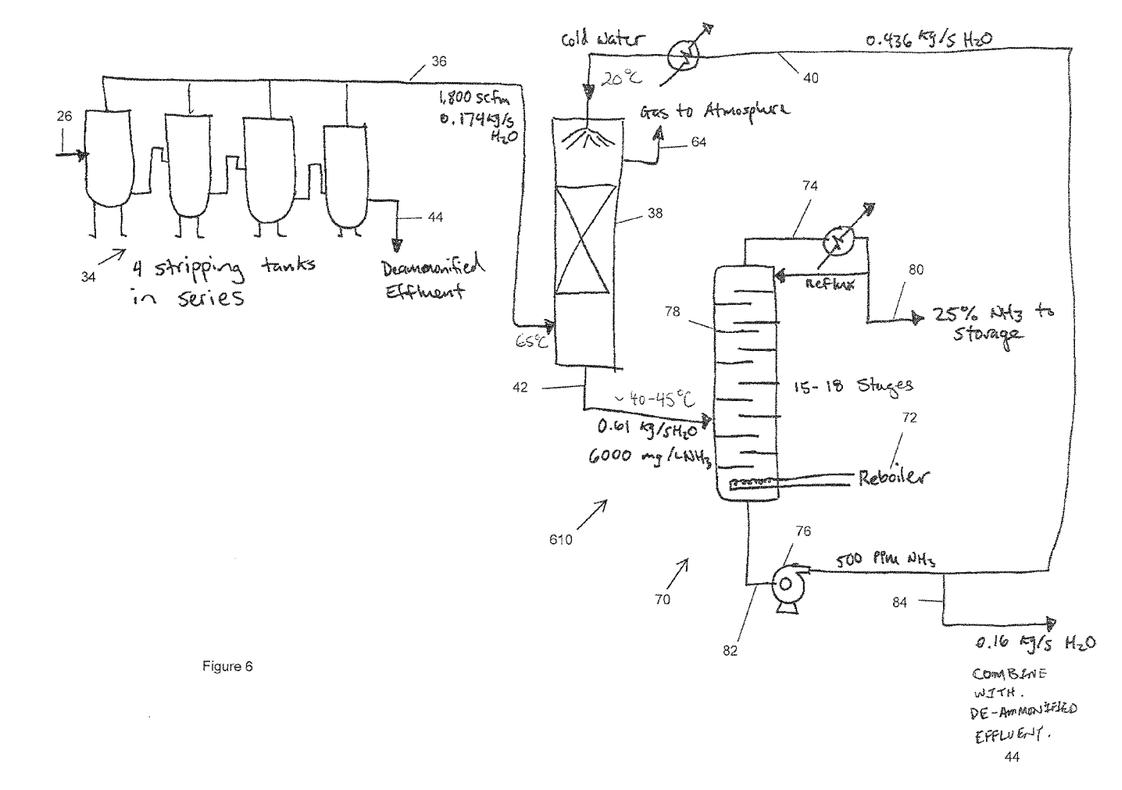
FIG. 6 is a schematic process flow diagram of an alternative ammonia recovery system.

FIG. 6 shows an alternative ammonia recovery system 610 for producing an ammonium compound solution 42. In particular, an ammonium hydroxide solution is produced. In some cases, there is no market for ammonium sulfate solution or ammonia enhanced fertilizer. However, there may be a market for ammonium hydroxide to be used as an industrial chemical.

In the ammonia recovery system 610, second filtrate 26 is treated in an ammonia stripper 34 to produce a mixed gas stream 36. The mixed gas stream 36, for example at about 65 degree C. and fully saturated, is sent to a gas scrubbing unit 38. The mixed gas stream 36 contains a moderate concentration of ammonia gas, but not so much that 25 wt % ammonium hydroxide, which is a marketable concentration, can be produced directly. The mixed gas stream 36 is scrubbed using cold water, for example about 20 degrees C., in a counter current packed bed gas scrubbing unit 38. The ammonia is scrubbed into the absorbent liquid as ammonium hydroxide and at the same time, entrained water is condensed. Once the mixed gas stream 36 is sent through the gas scrubbing unit 38, the scrubbed gas 64 can be directly vented to atmosphere or reused as process air.

An ammonium salt solution 42 is produced at about 40-45 degrees C. in the sump of the gas scrubbing unit 38. This ammonium salt solution 42 has about 1-6% $NH_3$ as ammonium hydroxide. The ammonium salt solution is sent to a distillation column 70, alternatively called a rectifier. The distillation column 70 has a reboiler 72, condenser 74, recirculation pump 76 and a column 78. Disillate 80 may be made up to a concentration of at least 25% $NH_3$ by weight. The bottoms 82 are low in ammonia and are sent back to the gas scrubbing unit 38 to be used as absorbent. The bottoms 82 are first chilled such that the gas transfer efficiency is increased. Surplus bottoms 84 are low in total solids and ammonia. They can be combined with the stripped filtrate 44 from the ammonia stripping process or treated alternatively or discharged directly. The ammonium salt solution 42 is usually very clean and ultrafiltration is typically not required on the ammonium salt solution 42 or bottoms 82.

In the description above, the terms solids portion and liquid portion indicate the higher solids content and lower solids content, respectively, of two streams produced from a solid-liquid separation device. The solids portion still contains some liquid, and the liquid portion still contains some solids. Depending on the particular solid-liquid separation device used, the solids portion might be called screenings, cake, retentate, reject, thickened solids, sludge, bottoms or by other terms. The liquid portion might be called effluent, permeate, filtrate, centrate or by other terms.

The word "digestate" is sometimes used in the art to refer specifically to the solid portion of an effluent stream taken from an anaerobic digester. In this specification, however, digestate is used to refer to a stream drawn from a digester before it is separated. Parts of this specification also relate to anaerobic digesters in the form of mixed tanks or CSTRs. In these cases, the word digestate is also used to refer to the entire mixed contents of the tank and digestate withdrawn from the tank is similar in composition to digestate in the tank.

Unless stated otherwise or apparent from the context, solids contents or concentrations mentioned in this specification are total suspended solids (TSS). In digestate, the total solids (TS) is approximately the same as dried solids (DS) and roughly 10% higher than total suspended solids (TSS). For example, a 5% DS digestate may have 46,000 mg/L of TSS and 4000 mg/L total dissolved solids (TDS). Accordingly, solids contents or concentrations of one type given in this specification can generally be substituted with TS or DS concentrations without causing a material difference in the process. Concentrations given as a percentage are weight percent unless stated otherwise.

The descriptions of processes and apparatus above are to provide at least one example of an embodiment within each claim but not to limit or define any claim. However, it is possible that a particular process or apparatus described above is not within a specific claim. Process parameters are given as examples of how a system may be operated and are not meant to limit a claim unless explicitly recited in a claim. Other processes for similar applications might operate at parameters within ranges that are 50% or 100% larger in both directions than the parameter ranges described above, or within a 50% or 100% variation from a single parameter described above. If one or more elements or steps described above are used to treat other wastes or under other conditions, then one or more process ranges described above might not be suitable and would be substituted with other appropriate parameters. Various sub sets of the unit processes described in relation to system 10 can be used in other treatment plants. Various sub sets of unit processes in the system 10 described above may also be combined in ways other than those described to produce different systems. Words such as "may", "preferable" or "typical", or variations of them in the description above, indicate that a process step or apparatus element is possible, preferable or typical, according to the word used, but still optional and not necessarily part of any claimed invention unless explicitly included in a claim.

We claim:

1. A process comprising steps of,
   a) separating a solids portion and liquid portion from an anaerobic digester digestate;
   b) stripping ammonia from the liquid portion to produce an ammonia stripped liquid; and,
   returning 80% or more of the ammonia stripped liquid to the anaerobic digester.

2. The process of claim 1 further comprising a step of passing a mixed gas flow resulting from step b) through a scrubber to produce an ammonium salt solution.

3. The process of claim 2 wherein the ammonium salt solution is added to the solids portion.

4. The process of claim 3 wherein the solids portion is not thermally dried after adding the ammonium salt solution.

5. The process of claim 3 wherein the solids portion is not thermally dried.

6. The process of claim 2 wherein the ammonium salt solution is concentrated by distillation.

7. The process of claim 1 wherein step a) comprises two solid-liquid separation steps.

8. The process of claim 7 wherein a first of the solid-liquid separation steps comprises removing fibers from the digestate.

9. The process of claim 1 wherein step b) comprises heating the liquid to at least 50 degrees C., flowing the ammonia through a series of sequential stages, and blowing bubbles of air into the liquid in the stages.

* * * * *